United States Patent [19]

Scotese et al.

[11] Patent Number: 5,000,574
[45] Date of Patent: Mar. 19, 1991

[54] INTERFEROMETRIC SURFACE DISTORTION DETECTOR

[75] Inventors: Arthur E. Scotese, Audubon; Shih L. Huang, Southampton; Armando J. Gaetano, Willow Grove, all of Pa.

[73] Assignee: The United States of America as represented by the Secretary of the Navy, Washington, D.C.

[21] Appl. No.: 342,919

[22] Filed: Apr. 20, 1989

[51] Int. Cl.⁵ .......................... G01B 11/24; H01J 3/14
[52] U.S. Cl. ................................ 356/376; 250/237 G
[58] Field of Search ....................... 356/376, 374, 373; 250/237 G

[56] References Cited

U.S. PATENT DOCUMENTS

| | | |
|---|---|---|
| 3,619,064 | 11/1971 | Brooks ................................ 356/376 |
| 3,762,818 | 10/1973 | Johnson et al. ..................... 356/376 |
| 3,796,498 | 3/1974 | Post ................................ 250/237 G |
| 4,030,830 | 6/1977 | Holly . |
| 4,051,483 | 9/1977 | Suzuki . |
| 4,079,252 | 3/1978 | Brake . |
| 4,527,056 | 7/1985 | Burkhardt et al. . |
| 4,659,220 | 4/1987 | Bronte et al. . |

Primary Examiner—Richard A. Rosenberger
Assistant Examiner—Hoa Pham
Attorney, Agent, or Firm—James V. Tura; James B. Bechtel; Susan E. Verona

[57] ABSTRACT

Portable shadow moire apparatus is disclosed for indiscriminately manipulating the grid and light source thereof over a specimen surface, with the grid oriented substantially in parallel therewith and in close proximity thereto. Self aligning support is provided on such apparatus, along with height adjustability for that support. Utilization of very high density grids is made possible by such apparatus to enhance the detection sensitivity thereof. Light source direction variability is also provided to control the magnitude of detectable distortion.

8 Claims, 1 Drawing Sheet

INTERFEROMETRIC SURFACE DISTORTION DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Various types of stress on structural components can cause unnoticed damage therein which propagates progressively and finally results in catastrophic failure. Typically such damage is accompanied by some kind of surface distortion to the material of the structural component. Tensile stress overload causes localized reduction or neck down in cross-sectional area, while impact stress causes surface indentations in the material and compressive stress overloads causes the material to buckle. Furthermore, cyclic stress is known to cause progressive damage in materials but evidence of such damage in homogeneous material such as metal and in laminated composite material such as graphite/epoxy is very difficult to detect. With homogeneous material, fatique cracks develop in planes normal to the outer surface thereof, while ply separation commonly develops in planes parallel to the outer surface of laminated composite materials. Of course, surface distortion also accompanies such damage in either homogeneous or laminated composite materials.

A variety of non-destructive techniques have been employed to detect structural damage in its early stages, such as shadow moire, utrasonics, x-ray, thermographics, laser holography, acoustic emission monitoring and the use of magnetic filings.

However, none of these techniques have been developed for all types of damage encountered and many involve cumbersome equipment. Furthermore, few of these techniques are sufficiently portable for use in field inspections and most have proven unreliable in environments where temperature, humidity, and vibration are encountered.

SUMMARY OF THE INVENTION

It is the general object of the present invention to provide shadow moire apparatus of compact design which can be indiscriminately located on specimen surfaces to detect out-of-plane distortions thereon e.g. elevation or depth.

It is a specific object of the present invention to provide shadow moire apparatus in accordance with the above stated general object wherein a self aligning support arrangement is incorporated therein.

It is another specific object of the present invention to provide shadow moire apparatus in accordance with the above stated general object wherein the height thereof from the specimen surface is adjustable.

It is still another specific object of the present invention to provide shadow moire apparatus in accordance with the above stated general object wherein a high density grid is incorporated therein.

It is a more specific object of the present invention to provide shadow moire apparatus in accordance with the above stated general object wherein collimated light is angularly directed to control the magnitude of detectable distortion for each successive moire fringe.

It is still a more specific object of the present invention to provide shadow moire apparatus in accordance with the above stated general object and each of the above stated specific objects for use on flat specimen surfaces.

These and other objects are accomplished by structuring portable apparatus to indiscriminately locate a single moire grid in parallel with and close proximity to specimen surfaces for detecting out-of-plane distortion thereon. In one preferred embodiment of the invention, the apparatus is made self aligning on the specimen surface by providing support therefor on three points of contact with that surface. An adjustable height between the apparatus and flat specimen surfaces is provided in other preferred embodiments, by securing the grid in a hand-held frame and passing screws therethrough to provide such contact points. At least one such screw is utilized to tilt the grid relative to the specimen surface and thereby enhance sensitivity. A very high density grid is utilized in still other preferred embodiments, and collimated light is directed to control the magnitude of detectable distortion for each successive moire fringe. The source of collimated light is secured to an adjustable arm by which the angle and distance of the light relative to the grid, may be varied in further embodiments.

The scope of the present invention is only limited by the appended claims for which support is predicated on the preferred embodiments hereinafter set forth in the following description and the attached drawings wherein like reference characters refer to like elements throughout the several figures.

DESCRIPTION OF THE PREFERRED EMBODIMENTS

Figure 1:
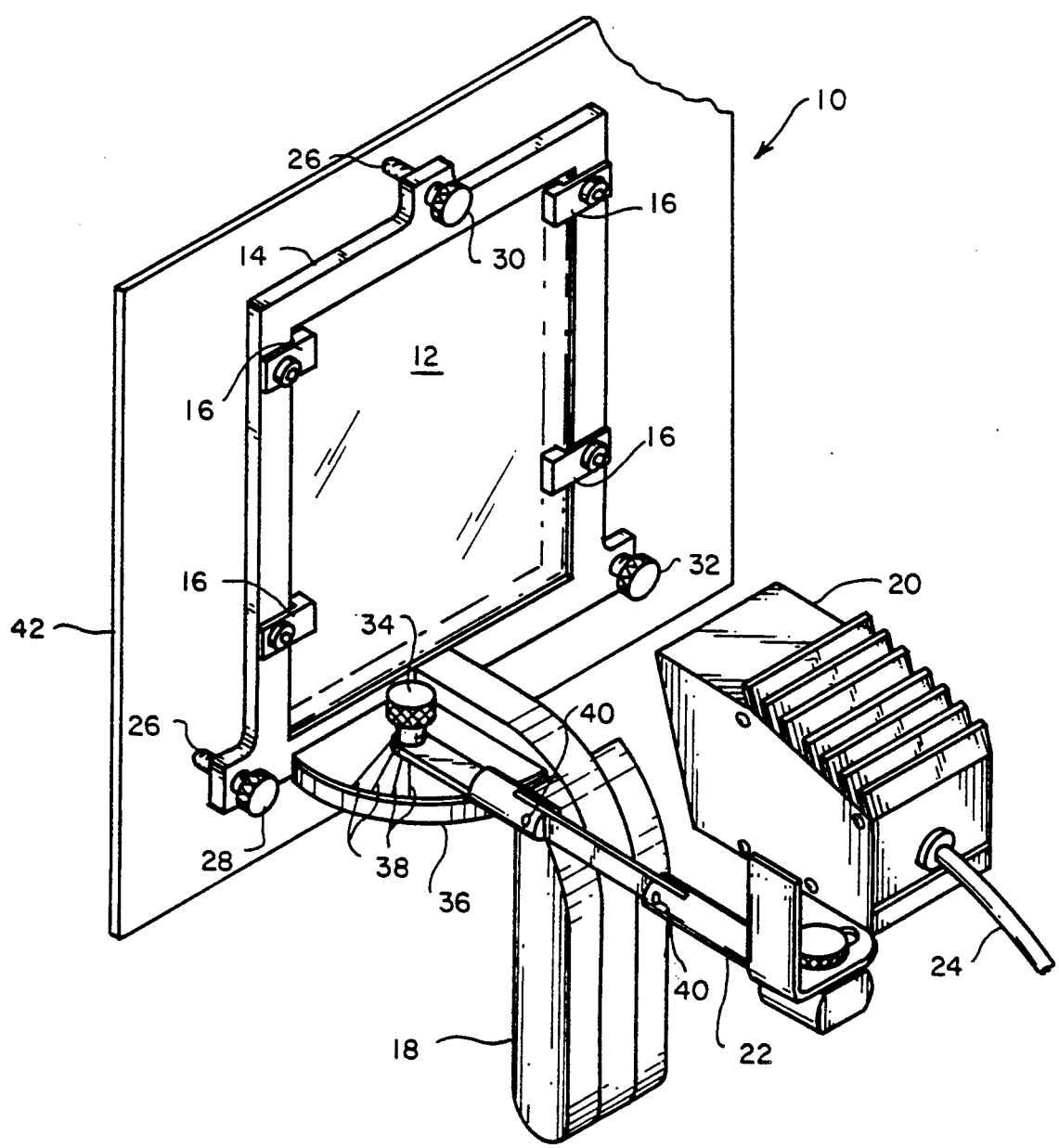
FIG. 1 is an isometric view of shadow moire apparatus which facilitates out-of-plane distortion detection on flat surfaces and illustrates the preferred embodiments of the invention.

The present invention applies moire interferometry to apparatus which detects surface irregularities or out-of-plane distortion. Moire interferometry was first developed for the detection of in-plane displacements. For such applications, two grids having finely ruled lines are superpositioned relative to a surface of a test specimen. One grid is affixed to the specimen such as by printing it on, bonding it to, or etching it into the surface of the specimen. The other grid references the position of the lines on the specimen grid and is aligned therewith in some manner, such as through a lens. When subjected to mechanical forces, the test specimen and specimen grid are deformed or displaced which causes a change in pitch (line-to-line distance) of the specimen grid rulings, and moire fringes will be produced if light is obstructed by any non-aligned lines on the specimen and reference grids. The moire fringes represent the loci of points of constant displacement in a direction normal to the grid lines and appear as black bands. When the lines of one grid align with the spaces between the lines of the other grid, light is obstructed and moire fringes are produced.

Single grid moire apparatus is also well known in which light is directed to the test specimen at some angle through a master grid. A shadow of the master grid is projected onto the specimen surface as a shadow grid and is distorted by the out-of-plane elevation or depth of the surface to produce fringes in accordance with the out-of-plane distortions which are viewed through the master grid. A set of visible fringes provides a map of constant elevation locations and thereby reveals the topography of the surface being observed. When surface irregularities exist on the specimen, the pitch of the shadow grid changes which causes the lines of the master grid to obstruct the light reflected by the specimen surface and black moire fringes appear on the master grid.

This invention relates to shadow moire apparatus for detecting and measuring out-of-plane distortions on the surface of a specimen, such as a wing of an airplane. Shadow moire apparatus is well known for accomplishing such detection, wherein a source of light is directed through a single grid at some angle with a normal to the plane of the grid. However, such apparatus is supported by an arrangement of guide rails or other supporting structure and tends to be very bulky. Furthermore, the guide rails render it very cumbersome to use because extensive set up is required at each location on the specimen to be examined beyond the range of the guide rails. Also, such a guide rail arrangement severely limits how close the grid can be located to the specimen surface. The shadow moire apparatus of the invention comprises portable means for indiscriminately manipulating the grid and light source over the specimen surface, with the grid oriented substantially in parallel therewith and in close proximity thereto. For shadow moire apparatus generally, distortion sensitivity is determined in accordance with the equation $Z=1/(P \tan \Phi)$; where Z is the magnitude increment of detectable distortion for each successive fringe, P is the grid line density in lines per inch, and $\tan \Phi$ is the angle between the direction of the light source and the normal to the plane of the grid surface, e.g. any angle from the normal as shown by the angular gradation marks 38 in FIG. 1. Because the breadth of the shadow cast by the grid lines decreases as the grid is placed closer to the specimen surface, the grid line density can therefore be greatly increased in the shadow moire apparatus of the invention, such as to a density of between 300 and 1000 lines per inch. Of course, as can be seen from the above mentioned equation, the higher the grid line density of the shadow moire apparatus, the smaller its distortion sensitivity. Therefore, the very high grid line density made possible by the shadow moire apparatus of this invention, provides means of detecting significantly smaller distortions than was possible with the prior art shadow moire apparatus.

Some embodiments of the invention are illustrated in FIG. 1, which relates to a hand-held shadow moire apparatus 10 for detecting or measuring out-of-plane distortion e.g. elevations or depth of the surface on substantially flat surfaces. In apparatus 10, a grid 12 is secured in a frame 14 using any suitable means such as elastic dogs 16. A handle 18 such as a pistol grip, is affixed to the frame 14 and a source of light 20 is affixed relative to the frame 14 on an arm 22 for directing the light from the source 20 through the grid 12 at an angle with the normal to the plane of the grid 12. Of course, the light source 20 can be energized in many different ways, such as from an external battery pack through an electrical cable 24. The apparatus 10 is operated by griping the handle 18 to indiscriminately manipulate the grid 12 and light source 20 over the specimen surface 42 at any desired location thereon, with the grid 12 oriented substantially parallel therewith and in close proximity thereto. In accordance with conventional shadow moire theory, fringes will then appear on the surface of the grid 12 to indicate where out-of-plane distortion of a predetermined magnitude exists at that location.

Actually, the frame 14 is in contact with the specimen surface 42 during this manipulation and it spaces the grid at a predetermined height from that surface in accordance with the number of lines on the grid 12 and the angle of the light source 20 is parallel to the plane of the grid 12. The specimen surface 42 may not be perfectly flat and thereby cause the frame to rock thereon which of course, adversely affects the accuracy of the apparatus 10. For this reason, three contact points 26 are disposed on the frame 14 in another embodiment of the invention, to provide self-aligning support for the apparatus 10 on the specimen surface. Furthermore, it may be desirable to vary the height of the grid 12 above the specimen surface 42 to optically attune the apparatus 10 to detect or measure different magnitudes of out-of-plane distortions of either concave or convex configurations. For this reason, the contact points 26 are provided with machine screws 28, 30 and 32 disposed through the frame 14 in holes having matching threads thereto, in still another embodiment of the invention. In a further embodiment of the invention, only one of the contact points 26 is provided with machine screw 30 which is adjustable inward to tilt one end of the grid 12 relative to the specimen surface. Linearly parallel carrier fringes which encounter out-of-line perturbations to detect and measure out-of-plane distortions are induced to enhance the sensitivity of the apparatus 10 when the grid 12 is tilted relative to the specimen surface. Such carrier fringes are derived by increasing the spacing between the master and shadow grids because the effective density of the shadow grid is increased thereby. Of course, out-of-plane distortion on the specimen surface will warp the linear nature of the parallel carrier fringes to result in out-of-line malformations therein. In a still further embodiment, the light source 20 is collimated to provide a precisely defined shadow grid for greater accuracy.

Sensitivity of the apparatus 10 may also be enhanced by increasing the angle between the direction of the light 20 and the normal to the plane of the grid 12. Such an increase causes longer shadows to be cast by the lines of the grid 12 and therefore, moire fringes will occur on the grid 12 for an out-of-plane distortion of a lesser magnitude. To provide variable adjustability for this angle in other embodiments of the invention, the arm 22 is pivotally affixed relative to the frame 14 with a knurled cap screw 34. A plate 36 having a hole with matting threads for the cap screw 34, is disposed as a gusset between the frame 14 and the handle 18. The arm 22 is retained to the plate 36 by the cap screw 34 at any angular orientation to direct the light from the source 20 as desired. Angular gradation marks 38 may be applied to the surface of the plate 36 to facilitate positioning of the arm 22 to the desired angle. In still other embodiments, at least one pivot joint 40 may be incorporated in the arm 22 to provide length adjustability thereof for varying the intensity of the light 20 on the grid 12.

The concept of this invention may be implemented in apparatus for distortion detection or measurement on non-flat surfaces, such as the surface of a shaft. In such apparatus, the grid is configured to conform to the non-flat surface, such as a cylinder which fits about the shaft with little clearance existing therebetween. To provide mobility for the grid cylinder over the shaft along the axis thereof each longitudinal end of the grid cylinder is retained by a circular collar having friction reducing means such as wheels disposed thereabout at 120° spacing. Such friction reducing means may be directed either along or about the axis of the shaft. The light source can be affixed to the circular collar at either end of the grid on which the lines thereof may be directed either along or about the axis of the shaft.

Those skilled in the art will appreciate without any further explanation that many modifications and variations are possible to the above disclosed interferometric surface distortion detector embodiments, within the concept of this invention. Consequently, it should be understood that all such modifications and variations fall within the scope of the following claims.

What we claim is:

1. In a shadow moire apparatus wherein a light source is directed through a single grid at an angle with respect to a plane of the grid to detect and measure out-of-plane distortions on a surface of a specimen comprises:
    a portable apparatus having a grid secured by a frame with means for indiscriminately manipulating a high-density grid having between 300 and 1000 lines per inch and a collimated light source over the surface thereof; said grid oriented substantially parallel with the specimen surface and in close proximity thereto; said frame having at least three contact points thereon to provide self-aligning support of the apparatus on the specimen surface.

2. The apparatus of claim 1 wherein a height thereof from the specimen surface is adjustable at least at one of said contact points to tilt one end of said grid relative to the specimen surface for enhancing sensitivity by inducing linearly parallel carrier fringes which encounter out-of-line perturbations to detect surface distortions.

3. The apparatus of claim 1 wherein a height thereof from the specimen surface is adjustable at each contact point to optically attune said apparatus for either concave or convex distortions.

4. The apparatus of claim 1 wherein the angle between the direction of the light source and the plane of the grid is variable to control the magnitude of detectable distortion by changing the breadth of the shadow cast by the grid.

5. Hand-held shadow moire apparatus for detecting and measuring out-of-plane distortions on a surface of a specimen which comprises:
    a grid having between 300 and 1000 lines per inch ruled thereon;
    a frame for securing said grid;
    means affixed to said frame for manipulation thereof to indiscriminately position said grid substantially in parallel with the specimen surface;
    a collimated light source affixed relative to said frame and directed through said grid at an angle normal to a plane of the grid;
    moire fringes developed by the grid at selected locations on the specimen surface in accordance with the magnitude of detectable distortions for the apparatus;
    said frame having three contact points to provide self-aligning support of said apparatus on the specimen surface.

6. The apparatus of claim 5 wherein a height of said frame from the specimen surface is adjustable at least at one of said contact points to tilt one end of said grid relative to the specimen surface and thereby enhance the sensitivity of said apparatus by inducing linearly parallel carrier fringes which encounter out-of-line perturbations to detect surface distortions.

7. The apparatus of claim 5 wherein a height of said frame from the specimen surface is adjustable at each said contact point to optically attune said apparatus for either concave or convex distortions.

8. The apparatus of claim 5 wherein the angle between the direction of said light source and the plane of said grid is variable to control the magnitude of detectable distortion by changing a breadth of the shadow cast by said grid.

* * * * *